Nov. 22, 1966  K. G. SCHROEDER  3,287,670
HIGH POWER FERRITE STACKED DISC CORE HF
TRANSFORMERS AND/OR POWER DIVIDERS
Filed March 19, 1965  7 Sheets-Sheet 1

*INVENTOR.*
KLAUS G. SCHROEDER
BY
Moody and Kintzinger
*ATTORNEYS*

Nov. 22, 1966 K. G. SCHROEDER 3,287,670
HIGH POWER FERRITE STACKED DISC CORE HF
TRANSFORMERS AND/OR POWER DIVIDERS
Filed March 19, 1965 7 Sheets-Sheet 5

INVENTOR.
KLAUS G. SCHROEDER
BY
ATTORNEYS

Nov. 22, 1966 K. G. SCHROEDER 3,287,670
HIGH POWER FERRITE STACKED DISC CORE HF
TRANSFORMERS AND/OR POWER DIVIDERS
Filed March 19, 1965 7 Sheets-Sheet 6

INVENTOR.
KLAUS G. SCHROEDER
BY
*Moody and Kintzinger*
ATTORNEYS

FIG 14

United States Patent Office 3,287,670
Patented Nov. 22, 1966

3,287,670
HIGH POWER FERRITE STACKED DISC CORE HF TRANSFORMERS AND/OR POWER DIVIDERS
Klaus G. Schroeder, Dallas, Tex., assignor to Collins Radio Company, Cedar Rapids, Iowa, a corporation of Iowa
Filed Mar. 19, 1965, Ser. No. 441,196
12 Claims. (Cl. 333—79)

This invention relates in general to transformer core coupling and core cooling, and in particular, to a highly efficient signal transmitting stacked transformer core structure with multiple stacked cores interspaced with thermal conductive sheets, and to high frequency reactive dividers and/or circuit signal combiners utilizing such stacked core structures.

Autotransformer cores of square cross section, particularly of such cross section size required for high power usage, present problems of cooling, particularly at the center, and also problems of manufacture where cracking of ferrite sintered transformer cores over certain square cross section sizes is, increasingly with size, more likely to occur during manufacture. Furthermore, spurious coil winding frequency resonances are likely to arise in some of these high power transformers. Various ferrite core transformer hybrids are used as compact building blocks for signal dividing or combining networks in phased arrays. While low power "corporate feed structures" can readily be built using off-the-shelf HF hybrids, an existing high power steerable beam HF array uses quarter wave length transmission line hybrids that are, relatively speaking, huge. These require frequency dependent compensation for an inherent 90° phase shift and have been found, generally, to have an operational frequency bandwidth limited to only about an octave.

In providing high power ferrite transformers, efforts have been made to improve coupling efficiency by achieving greater effective permeability by utilizing bunched coils. While it would appear that effective permeability would be greater for the coil with larger mutual coupling, as would be provided with a bunched coil, it becomes apparent that winding configuration is a vital factor when both power handling capabilities and efficiency of operation are of increasing importance. It should be noted that in the bunched coil case only part of the magnetic mutual lines of force are immersed in the ferrite core material, whereas with applicant's single layer coil disc core transformer, with relatively narrow and long coil-winding slot windows, substantially all of the mutual magnetic flux lines of force are immersed in the ferrite core material. This effectively results in a desired larger effective permeability factor with applicant's single layer coil disc ferrite core transformer construction even though leakage inductance, as such, may not be smaller.

It is, therefore, a principal object of this invention to provide a highly efficient high power stacked disc core high frequency (HF) transformer useful as a high power autotransformer, as a transformer in a reactive power divider, high power step up hybrid circuits, in high power large step down hybrid circuits, and/or in high power signal combiner units.

Another object is to provide a disc core transformer construction having greatly reduced flux line lengths and, at the same time, allowing for maximum heat transfer from the winding to air or to conductive cooling plates interspersed between individual core segments of a core stack, and heat from the core segment stack to the conductive cooling plates.

A further object is to provide such an improved transformer with minimized heat build up in coil windings and/or maximized signal power handling capabilities, objectives that would be a much greater problem with circular or square core coil-winding windows and with the closely spaced windings generally used with such circular and square transformer coil-winding core windows.

Another object is to provide a high power transformer core configuration with narrow slot coil-winding windows allowing a highly efficient lightened, reduced size transformer construction with the coil windings through each slot window being in a single layer with maximized heat transfer dissipation characteristics, and with some transformers, winding impedance optimization with predetermined controlled spacing of coil turns.

A further object is to provide a high power ferrite core transformer with construction primarily to greatly increase operating bandwidth rather than being primarily for direct signal magnetic coupling through the core structure.

Another object is to provide a high power transformer, equipped with stacked ferrite core sections, a core height presenting a square ferrite core section within the winding cross section (or a multiple of a square winding cross section) for highest possible series resonances for a given coil winding length and thereby the largest possible bandwidth.

Features of this invention useful in accomplishing the above objects include, in various embodiments, ferrite disc core sections having relatively narrow transformer coil-winding slot windows, with the core sections stacked to present a substantially square cross section within the coil winding through the area of the stacked disc cores between the relatively narrow slot windows, and with cooling plates interspersed between the stacked ferrite core sections. Applicant's high power transformer structure is particularly applicable for use in, for example, power dividers, high power step up hybrid circuits, high power large step down hybrid circuits, and/or in high power signal combiner units. The improved transformer core construction lends itself particularly well to the use of common cooling plates extending through multiple transformer core structures of multiple transformers as used in such circuits. Further, it is beneficial to ground the center plate of such transformers to an outermost cooling plate to suppress spurious winding resonances resulting from leakage flux lines. Further, in addition to the transformers having single layer coil windings through core slot windows, is the provision, with some embodiments, of predetermined controlled spacing between individual coil turns of the coil windings for optimizing winding impedance.

Specific embodiments representing what are presently regarded as the best modes of carrying out the invention are illustrated in the accompanying drawings.

Figure 1:
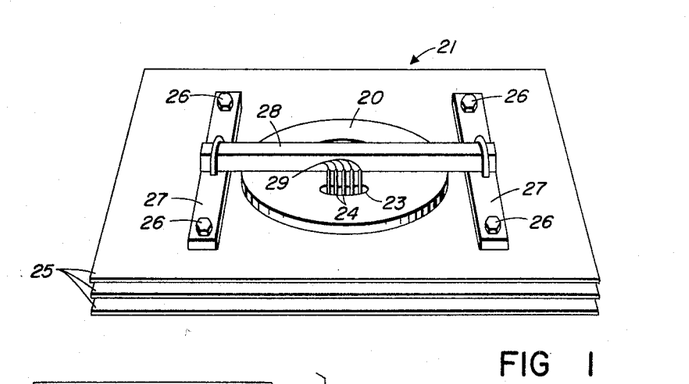
FIGURE 1 represents a perspective view of an assembled ferrite disc core transformer equipped with 4 stacked discs and 3 conduction cooling plates.
Figures 2, 3:
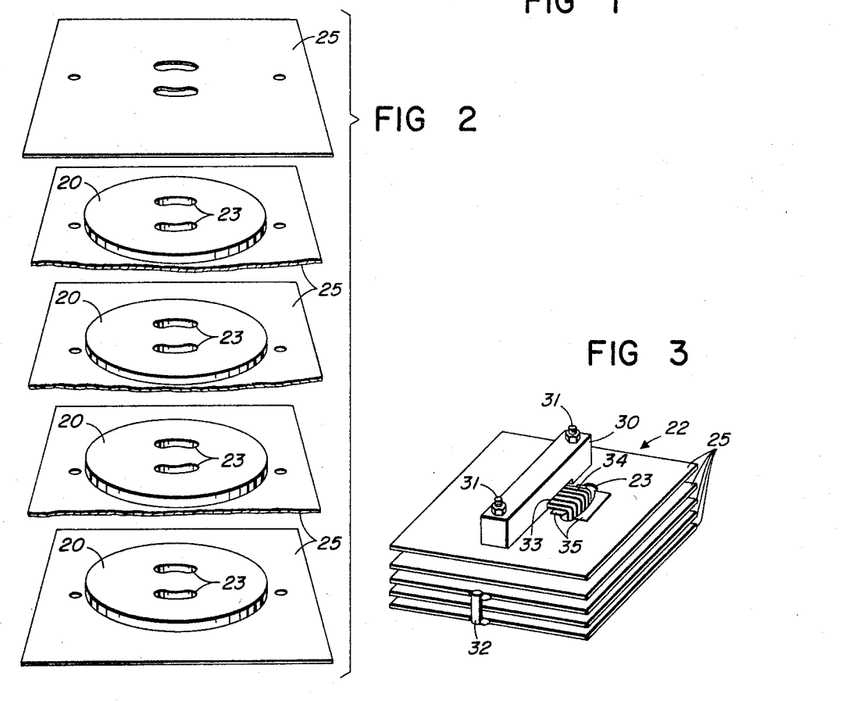
FIGURE 2, an exploded view of 4 ferrite disc core sections and 5 cooling plates such as would be employed, without the outer cooling plates, for providing the assembled disc core transformer of FIGURE 1.
FIGURE 3, a perspective view of the assembled disc core transformer that would be provided with the 4 disc cores and 5 cooling plates of FIGURE 2.
Figure 4:
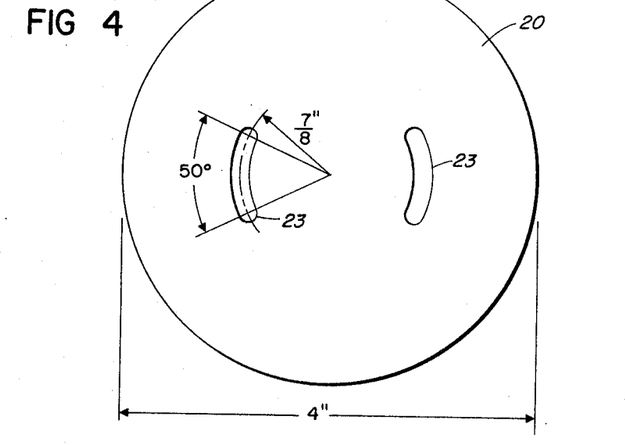
FIGURE 4, a top plan view of a narrow coil-winding slot window equipped ferrite disc core section as used in stacked disc core transformers as shown in FIGURES 1 and 3.
Figure 5:
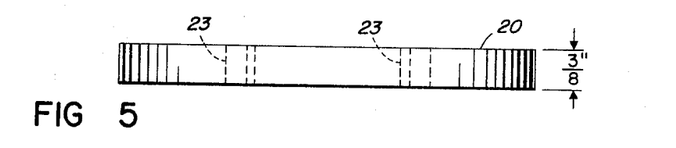
FIGURE 5, a side view of the disc core section of FIGURE 4.

Referring to the drawings:

The disc ferrite core section 20 configuration of FIGURES 1 through 5, as used in the transformers 21 and 22 of FIGURES 1 and 3, respectively, minimizes leakage inductance and thereby provides for maximum power signal coupling. The disc core construction illustrated by FIGURES 4 and 5 is shown, for example, to be a 4" diameter, ⅜" thick core section with two oppositely positioned relatively narrow, coil-winding-slot-windows 23 each positioned about a ⅞" radius circle line and extending through an arc of approximately fifty degrees. These provide a transformer core structure particularly useful when stacked to substantially a square core cross section through the coil winding cross section in a broadband high frequency transformer with an almost arbitrary impedance transformation ratio. Many pre-existing high power transformers, which generally are physically quite large to meet high power signal handling requirements, are limited to a 4:1 impedance transformation since coupling has generally been possible only with a bifilar type winding. With applicant's new transformer structure a square winding and core cross section results in the highest possible series resonance for given transformer coil 24 winding lengths and therefore the largest possible operational high power signal bandwidth. Further, the relatively small window area with the improved transformer construction insures good coupling between primary and secondary transformer coil windings particularly for a multiple core section winding configuration. Thus, performance with the new disc core transformer is much better throughout, for example, the 3 mc. to 30 mc. high frequency range than would be possible with toroidal cores in a transformer structure of the same power capability. Furthermore, the conduction cooling within the cores along with convection and radiation cooling outside the core area provided by the cooling plates 25 approximately 1/32" thick sandwiched between the core sections 20 is quite beneficial.

Figure 6:
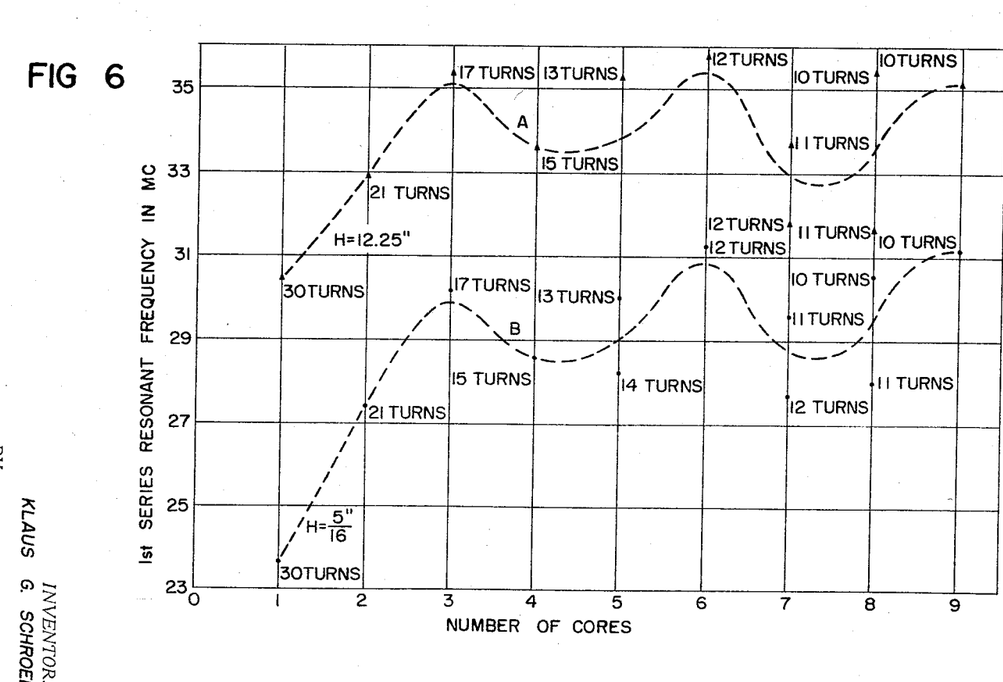
FIGURE 6, graph curves showing measured series resonant frequencies of single wire layer multi-turn coils as wound on ferrite toroidal cores stacked from one to nine with the cores 6 inch diameter toroids each having a cross section 0.6"×1.7"=1.02 square inches.

The graph curves A and B of FIGURE 6 show the measured series resonance frequencies of a single wire multi-turn coil wound on ferrite toroidal cores from one to nine stacked cores having an outside diameter of 6" and an inside diameter of approximately 2½" and being ⅝" thick. The core material used, giving the plotted curve results, was a commercially available nickel zinc doped iron oxide sintered ferrite material known as Indiana General Ferramic Q2 with a permeability factor "$\mu_0$" of approximately 40. Curve A was obtained with the transformer core section located 12¼ inches above a ground plane of conductive material, and the other, Curve B, with the transformer core structure spaced 5/16 inch above the conductive material ground plane. The cores were stacked from one to nine to increase the height, and the number of turns was reduced each time with each stacked height increase so as to keep the low-frequency inductance roughly constant. Since only integral numbers of turns are of interest, the resulting curves A and B include, in some cases, interpolations between various adjacent turn numbers. The two series of measurements made indicate that the series resonant frequency increases up to a square winding and core cross section, which is reached with three cores, and then starts to vary up and down such that it is maximum for integral multiples of that number of stacked cores that presented a square cross section.

The height of the core stack for the toroid cores for maximum series resonance has to obey the relationship $H \approx n$ (R max.—R min.). This formula is reduced to a general formula, as applied to applicant's new disc core, $H \approx n \times W$ where $n$ is any positive integer greater than zero, and W is the width of the ferrite material contained by the coil winding in the direction perpendicular to the height. This means the core should either have a square winding cross section, or the winding should be twice as high as wide, or three times as high, and so on. The variation in series resonant frequency between higher values is small, however, in comparison to its increase with core stack up to a square cross section. It also appears that the condition $H=2W$, results in a maximum series resonant frequency when the core stack has a small capacitance to ground consistent with the greater 12¼" height spacing above the conductive ground plane.

Applicant, in his transformer structure, utilizes disc core sections and intervening cooling plates stacked to a square cross section and particularly with the center cooling plate grounded to an outermost cooling plate. Fewer coil winding turns are then employed for obtaining the desired series resonance frequency with the conductive ground plate being through the center of the transformer core stack. Even with the conductive ground plane through the center the series resonant frequency curve results are much the same as with the curves A and B and substantially maximized at the square core cross section. The provision of the conductive ground plane through the center of the transformer by grounding of the center cooling plate to an outermost cooling plate is quite effective in suppressing undesired spurious resonant frequencies.

The center cooling plate 25 of the transformer 21 of FIGURE 1 is grounded to an outer plate as by one or more of the assembly bolts. The assembly bolts also mount units 27 for holding opposite ends of a phenolic type nonconductive assembly supporting bar 28 at the bottom and at the top of the transformer structure. It should be noted that the phenolic type nonconductive assembly supporting bar 28 of the transformer of FIGURE 1 is provided with coil turn spacing grooves 29 to insure a predetermined control spacing between individual coil turns for optimized winding impedance. Furthermore, in high power signal usage such spacing also minimizes coil wire installation requirements in avoiding voltage breakdown between adjacent coil turns in areas of large potential difference between adjacent coil turns. With bunched single-layer coils that are used with many high power toroidal core transformers, only part of the mutual flux lines are immersed in the ferrite core material which results in low effective permeability, whereas, for a coil turn single turn layer toroidal core transformer the leakage inductance is high. In the bunched winding of transformer 21, substantially all the mutual flux lines are immersed in the ferrite core material and, at the same time, the leakage inductance is low.

With the transformer 22 of FIGURE 3 phenolic type nonconductive assembly supporting bars 30 are mounted at the top and bottom of the transformer structure by through assembly bolts 31. This particular transformer has two more cooling plates than the transformer 21 of FIGURE 1 with the outermost plates 25 being outside the outermost surfaces of the outer disc core sections 20. In this transformer, a grounding bar 32, extended between the center cooling plate 25 and at least one outermost cooling plate 25, insures grounding of the center plate to an outermost plate should either of the mounting bolts 31 not provide adequate contact between the center cooling plate 25 and an outermost cooling plate 25. Each of the bars 30 are provided with an extended slot 33 with just sufficient space for a single layer of the coil turns of coil 34 supporting and protecting them in position in the transformer assembly. Coil turn insulation protecting tapes 35 are also provided, at both sides of the coil winding 34, extending through each slot window 23 of the transformer 22 for the protection of coil wire insulation with the protective tape being, for example, a composite Fiberglas Teflon type tape.

With reference to the disc core sections 20 both core material and core design are important factors in achieving reduction of core reluctance in relatively large cores for high power signal transformers. By way of illustration, the low frequency parallel inductance that will limit the low frequency operation of a broadband HF transformer is given by $$L = \frac{N^2}{R} = \frac{N^2}{l/\mu A}$$

where $$R = \frac{L}{\mu A}$$

with R being the magnetic reluctance, $l$ the mean length of the magnetic lines of flux, and A the coil winding cross section. As has been discussed hereinbefore, the first maximum series resonant frequency determining the maximum useful frequency of a broadband high frequency transformer attains the maximum frequency when the coil and core cross section A is substantially square. This is primarily so because the winding length (and therefore the interwinding capacitance) is at a minimum with the optimized coil winding and core square cross section construction.

Figure 7:
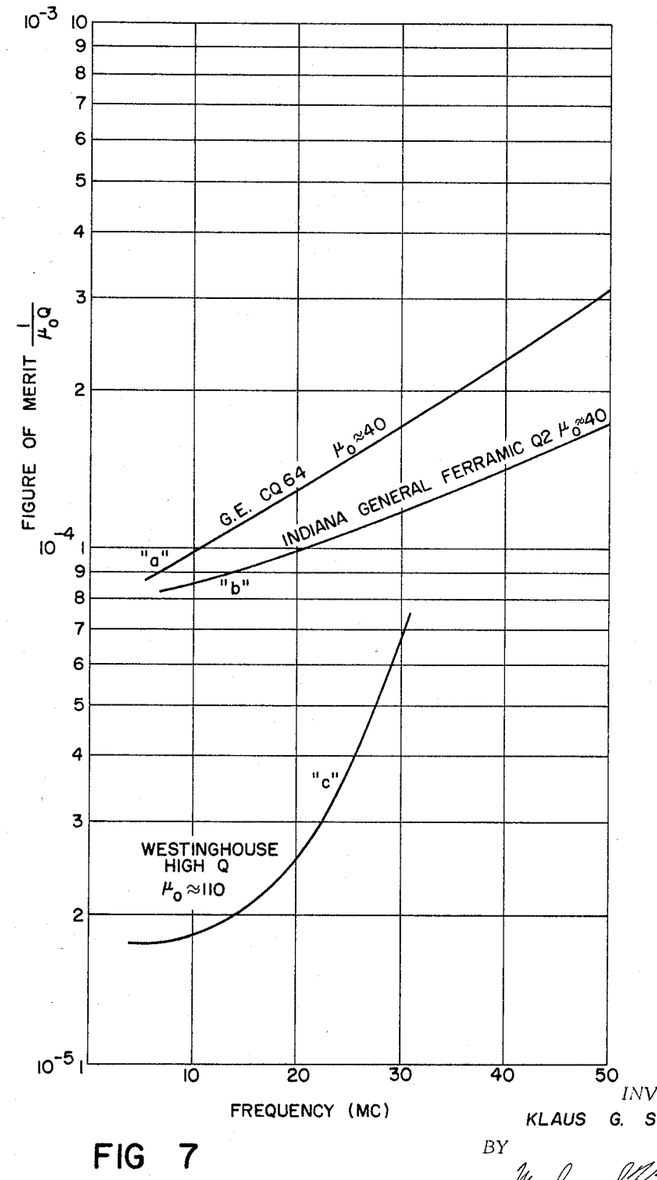
FIGURE 7, a graph of ferrite properties of several ferrite materials usable in applicant's ferrite disc section cores.

Maximum operating frequency is a fixed predetermined requirement with many high frequency, high power signal transformers with the maximum tolerable winding length determined by the maximum operating frequency of a particular transformer. These predetermined operational parameters that may be varied for optimizing of low frequency inductance include: permeability ($\mu$), the number of turns (M), and the mean magnetic circuitry flux lines length ($l$). The relative initial permeability $\mu_0$, is limited by increasing core losses with increasing frequency and by the higher core loss level at the predetermined transformer upper frequency limit. Core loss curves "a," "b," and "c" of FIGURE 7 illustrate core loss (figure of merit $$\frac{l}{\mu_0 Q}$$

increase characteristics with frequency increase (in mc.) for various ferrite material cores. Curves "a," "b," and "c" are for nickel zinc iron oxide sintered material cores including commercially available core materials known in the trade as General Electric CQ 64, Indiana General Ferramic Q2, and Westinghouse High Q, respectively, with the first two having an initial permeability $\mu_0 \approx 40$, and Westinghouse High Q a permeability factor $\mu_0 \approx 110$. From two of the core material curves it appears that with substantially the same initial permeability approximately the same core loss can be expected, and with the curve for the third material include a maximum factor difference of perhaps two. This does not leave very much room for improvement of this factor. Referring to the number of turns it appears that this factor is substantially fixed by the maximum tolerance winding length and winding cross section capable of providing the high power transformer operational parameters desired. The winding cross section, however, is determined by the maximum power that must be handled through the transformer. For winding ratios (e.g. 2:1) requiring winding ratios differing from the bifilar case most of the power has to be coupled through the ferrite material of the transformer. The loss factor and power density thus determine the degree of heat loss in the core, and dictate a minimum core volume limit as determined by heat transfer factor limitations which, in turn, determine minimum core and coil winding cross section.

The only other meaningful variable left for high frequency, high power signal handling capability optimization is the shortening of the mean length of the flux lines. Obviously, toroidal cores do not optimize magnetic flux line length. It appears that applicant's ferrite disc core with elongated narrow slot windows, as described hereinbefore, provides a near optimum design. In his ferrite core section and alternate cooling plate, stacked to a substantially square core cross section, configuration applicant provides greatly reduced flux line length. At the same time, this stacked transformer core construction allows for maximized heat transfer from transformer coil windings to the air and/or to the cooling plates by conduction in the center of the core stack and, ultimately, from the extensions of the cooling plates outside the core stack, by radiation and convection. Here again, it should be noted that a circular or square transformer core coil-winding window configuration would not be optimum even though the flux line length with such a transformer configuration may be some shorter, particularly because of greater heat build up problems encountered in such closely spaced transformer coil windings. Moreover, it is difficult to separate individual turns in such transformer coil windings, or to wind them in an orderly fashion, and a thicker insulation is required to avoid voltage breakdown between adjacent portions of coil turns having large potential differences.

Various transformation ratios obtainable with applicant's disc core transformer, include: 1:1; 1.4:1; 1.5:1; 1.8:1; 2:1; 2.5:1; 2.8:1; 3:1; 3.2:1; and 4:1. These transformation ratios are provided by various respective coil winding configurations such as the following: 4 and 1 turns; 4 and 2 turns; 4 and 3 turns; 5 and 1 turns; 5 and 2 turns; 5 and 3 turns; 5 and 4 turns; 3 and 1 turns; 3 and 2 turns; 3 and 3 turns; 4 and 4 turns; and 5 and 5 turns.

Figure 8:
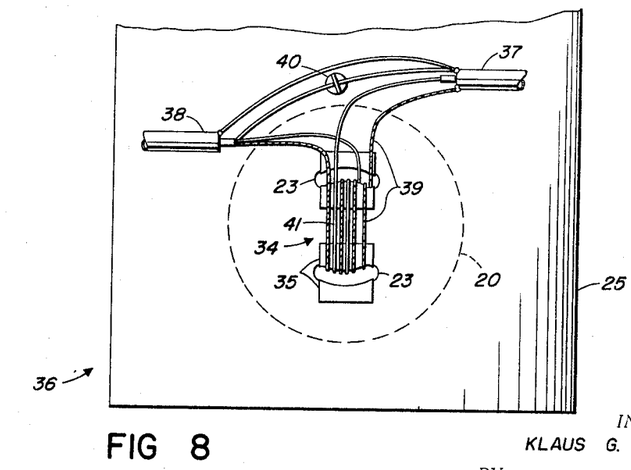
FIGURE 8, the winding and lead connection configuration for half of a divider circuit.
Figure 9:
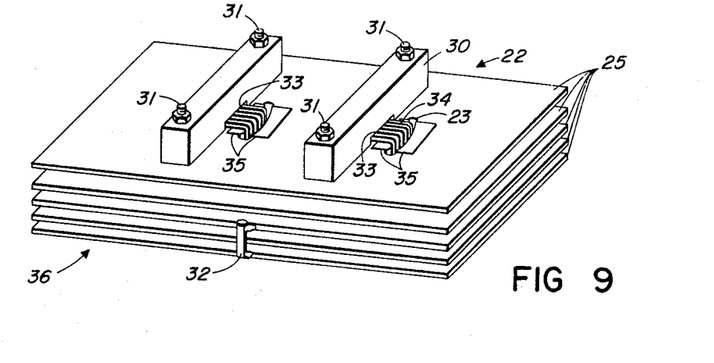
FIGURE 9, a bottom perspective view of a dual transformer assembly utilizing the transformer winding configuration of FIGURE 8 in a divider circuit.

The winding and lead connection configuration for half of a high power two core high frequency reactive divider (or combiner) circuit, shown in FIGURE 8, is used for the two transformer 22 disc transformer core 36 structure with common cooling plates 25, shown in FIGURE 9. The two cores of the divider (or combiner) 36 are mounted on the same cooling plates 25 for minimum size and wiring length. In this construction the wiring configuration includes a sum port connection 37 which has the dual leads running to the two transformer 22 sides of the divider 36. The divider circuit is provided with two coaxial output ports 38, one for each of the transformers 22 for action as dual input ports when the structure is used as a combiner. The outer sheaths of the coaxial sum port 37 and the other coaxial ports 38 are commonly interconnected to one end of a coil winding 39 of each of the transformer 22 sections of the divider 36 and also to a high voltage capacitor 40. The inner conductor of the coaxial sum port 37 is connected to one end of an additional coil winding 41 of each of the transformer 22 sections of the divider 36. The other ends of each of the two coil windings 39 and 41 are respectively connected in common to the inner conductor of the respective coaxial output port 38 and to the other side of the high voltage capacitor 40, of the respective transformer 22 section, having a connection with the outer sheath of sum port 37.

Figures 10, 11:
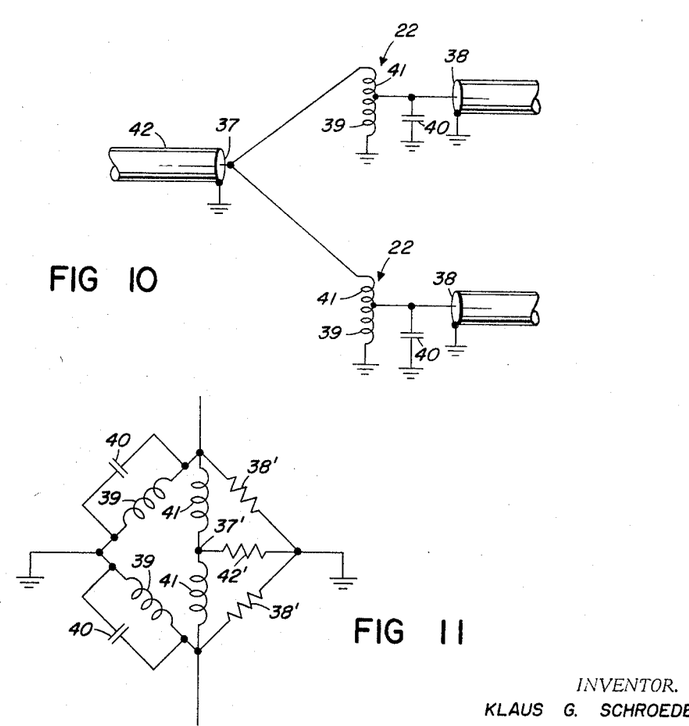
FIGURE 10, the circuit diagram for the power divider of FIGURES 8 and 9.
FIGURE 11, the A.C. signal equivalent circuit diagram of the signal power divider of FIGURES 8, 9, and 10.

Referring to the circuit diagram, shown in FIGURE 10, for the power divider of FIGURES 8 and 9, a 50 ohm coax line 42 terminates in sum port 37, which splits to 100 ohm effective impedances to each of the transformer sections 22, and with the outer sheaths of the coaxial line of sum port 37 and the coaxial lines (50 ohm characteristic impedance coaxial lines) of the other ports 38 connected to a common ground. Coils 41 are connected between the center conductor of sum port 37 and the center conductors of the respective ports 38, and the coils 39 extend between the center conductors of the respective coaxial lines of the 50 ohm impedance ports 38 and the common ground. The high voltage capacitor 40 of each transformer section 22 is connected between the center conductor of the coaxial line of the respective port 38 and the common connection between outer sheaths of the coaxial lines. The A.C. signal equivalent circuit diagram, of the signal power divider of FIGURES 8, 9, and 10, shows, in FIGURE 11, the effective impedance connections and apparent effective component locations in the A.C. signal equivalent circuit. This is with 37' representing the sum port 37 location, and with the 50 ohm resistors 38' and 42' representing the characteristic impedance of the coaxial line 42 and the coaxial lines of ports 38.

Figures 12, 13:
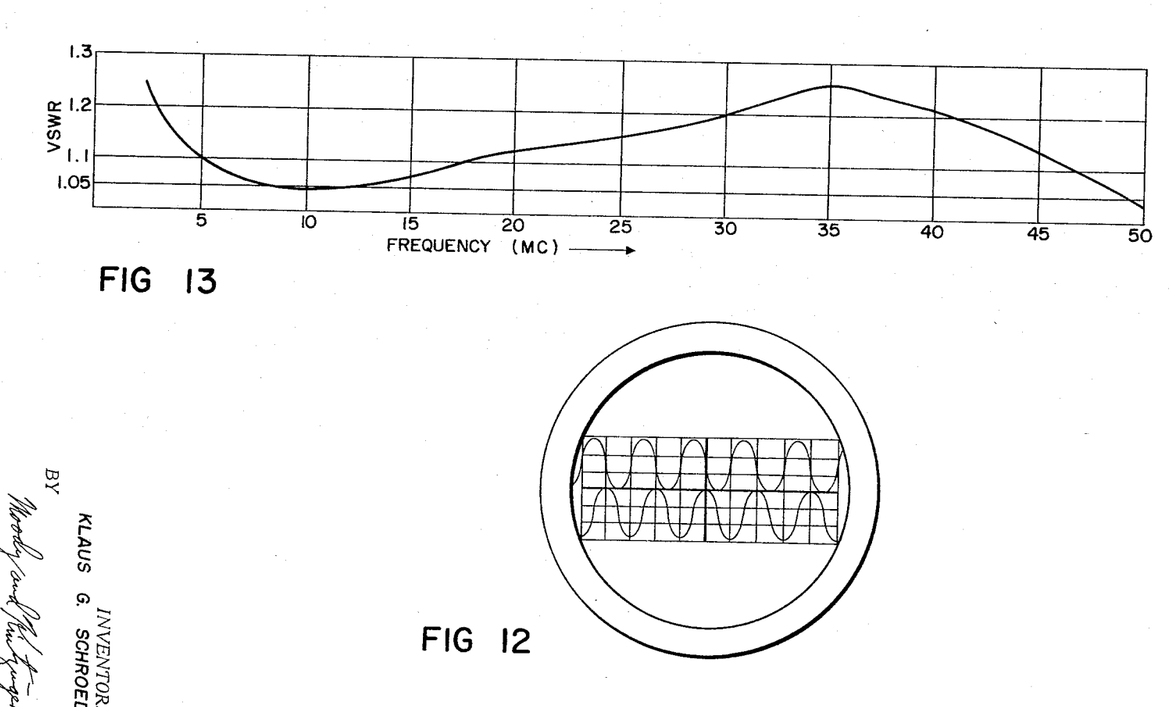
FIGURE 12, the input and output oscilloscope indicated signal curves of the reactive signal power divider of FIGURES 8 through 11 at a 10 kw. power level through each transformer as provided at various frequencies with the frequency varied through from a lower range up to 30 mc.
FIGURE 13, a graph of VSWR at the input sum port of the power divider of FIGURES 8 through 11 with matched impedance output loads.

FIGURE 12 shows input and output curves obtained with the reactive signal power divider of FIGURES 8 through 11 as displayed on an oscilloscope screen with 20 kw. RF power at the sum port 37 and substantially a 10 kw. signal power level through each transformer and with such measurements made from low frequencies up to 30 mc. These curves represent an input amplitude modulation of the 20 kw. signal input and the resulting detected output. The two oscilloscope traces representing the RF signal before and after the two disc core transformer divider indicates that substantially no distortion occurs up to at least a 20 kw. input power level and a 50%, 1000 c.p.s. amplitude signal modulation. Even at the higher frequencies approximating 30 mc. tested, the equilibrium temperature reached was approximately 170° C. with the environmental ambient temperature under 30° C. It is interesting to note that various insulations, such as teflon, used with various coil windings can stand continuous temperatures of at least 250° C. without danger of oxidation or decomposition.

Figure 14:
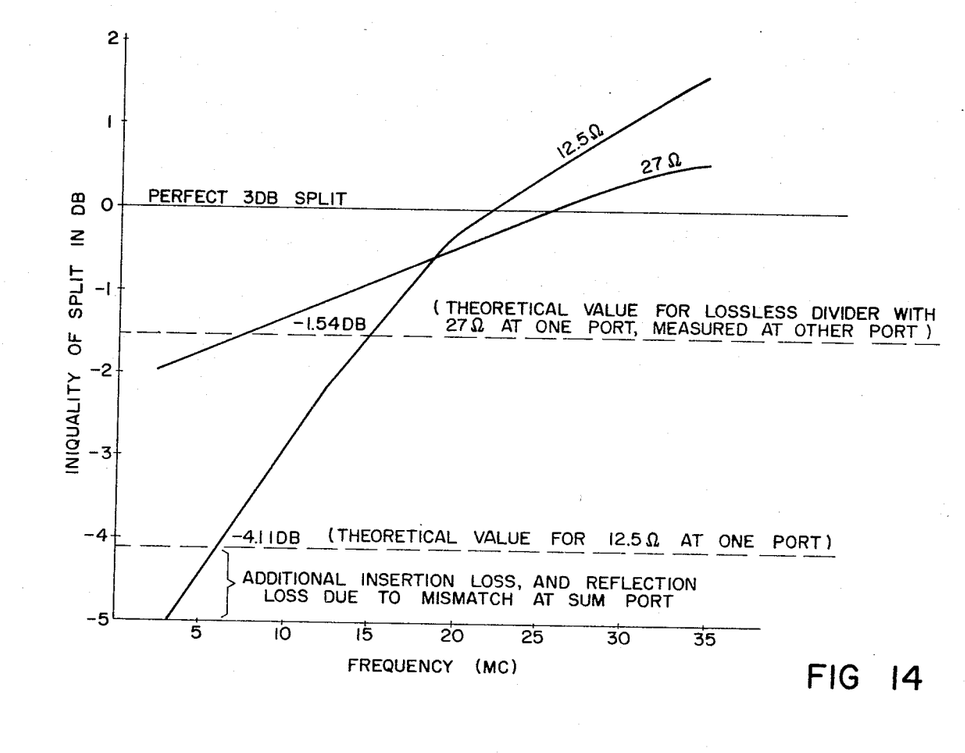
FIGURE 14, graph curves of the inequality of split in db for unequal loads and also for theoretical db output splits with ideal transformers.

The plotted curve of FIGURE 13 of VSWR versus frequency from a relatively low frequency of approximately 2½ mc. to 50 mc. indicated very good VSWR characteristics with the VSWR measured at the sum port 37 of the power divider of FIGURES 8 through 11 having matched loads at the two port 38 outputs. Please refer also to FIGURE 14 for additional plotted performance characteristic curves showing the inequality of power split in db for unequal loads and also curves showing theoretical db output splits with ideal transformers relative to and as deviations from a perfect 3 db split. The solid lines in FIGURE 14 show theoretical value results to be expected with substantially ideal transformers with the theoretical inequalities of split appearing being particularly accurate at the lower frequencies. With increasingly higher frequencies from the low frequencies the power division generally becomes apparently more equal, a factor attributable, at least to some extent, to non-ideal reactive behavior of the particular circuit by a larger factor with frequency increase to higher frequency levels.

With continued reference to the voltage divider and FIGURE 14, when the two output ports 38 are terminated with 50 ohm loads the power split is very nearly equal with both power output levels substantially 3 db below the power level at the sum port 38. Actually, only a rather small insertion loss occurs amounting to less than 0.1 db, at most, throughout the 3 mc. to 30 mc. frequency range.

With unequal loads, however, power is divided unevenly between the two output loads since, with the divider circuit shown and described, isolation between output ports is only about 6 db. Where the transformers are ideal, the output power at each of the output ports 38 is given as a function of load impedance as follows:

$$P_1 = P_0 \frac{R_2/R_1}{1+R_2/R_1}$$

and $$P_2 = P_0 \frac{1}{1+R_2/R_1}$$

with $P_1$ being the power out of one of the output ports 38, and $P_2$ the power out of the other port 38, $P_0$ being the power into the sum port 37, $R_1$ the load of one of the outputs at a port 38, and $R_2$ the load at the other output port 38. With resistive output loads of 27 ohms and 12½ ohms attenuation at the otherwise 50 ohm sum port with respect to a 3 db split, as indicated by the dotted curve lines, resulted in a $-1.54$ db attenuation at one output port 38 and a $-4.11$ db attenuation at the other output port 38. Furthermore, there is a mismatch loss (since the sum port is actually no longer 50 ohms with the unbalanced output loads) amounting to, with respect to the 27 ohm resistive load output port 38, an additional $-0.14$ db with VSWR at sum port $=1.4:1$, and relative to the 12½ ohm output port 38 an additional $-0.9$ db loss with VSWR at the sum port $=2.5:1$. Further, it should be noted that if the circuit is used as a combiner circuit for inphase signals of the same frequency instead of as the power divider described, insertion losses are typically about 0.1 db higher than encountered with its use as a divider.

Thus, it may be seen that this invention provides very effective and efficient multi ferrite disc core section equipped transformer constructions with the disc core sections having relatively narrow transformer coil winding slot windows. Furthermore, these transformers are found to be particularly effective with the core sections stacked to present a substantially square cross section, or a multiple thereof, within the coil winding through the area of the stacked disc core sections between the relatively narrow slot windows, and with cooling plates interspersed between the stacked ferrite core sections. A high power transformer structure is provided particularly applicable for use in, for example, power divider high power step up hybrid circuits, high power large step down hybrid circuits, and/or in high power signal combiner units. It is a transformer structure construction providing minimized heat build up in coil windings and/or maximized signal power handling capabilities with maximum heat transfer from coil windings to air or to conductive cooling plates interspersed between individual disc core sections of a core stack.

Whereas, this invention is here illustrated and described with respect to specific embodiments thereof, it should be realized that various changes may be made without departing from the essential contribution to the art made by the teachings hereof.

I claim:
1. In a high power frequency circuit usable as a reactive divider or combiner circuit having a plurality of high power high frequency transformers; a two conductor sum port, and a plurality of additional two conductor ports equal in number to the number of high power high frequency transformers common to the circuit; each of the transformers common to the circuit having stacked ferrite material transformer core sections, and non-ferrite material cooling plates interspersed between said ferrite material core sections; the stacked assembly of ferrite material core sections and non-ferrite material cooling plates of each of the transformers being provided with two elongate relatively narrow coil winding slot windows; a single layer of insulated wire coil turns passed through each of the slot windows of each transformer stacked core assembly; with the coil turn windings enclosing magnetic circuit ferrite core material between the slot windows of the stacked ferrite core material sections; said coil turn windings including coil turns of at least two transformer winding sections in each transformer assembly; said sum port being a two conductor terminal connection having one conductor with lead connections to a first winding section of two winding sections in each of the plurality of transformers of the circuit, and the other conductor of the sum port having a connection with a second winding section of each transformer, and a connection in common with a conductor of each of said additional two conductor ports of the circuit; and the other ends of each of first and second winding sections of each transformer having a connection with a second conductor of the respective port of said additional ports individually associated therewith.

2. The high power high frequency circuit of claim 1, wherein said two conductor sum port and the additional two conductor ports are the terminal ends of respective coaxial lines with the coaxial center line being one conductor and the outer coaxial sheath being the other conductor of each respective coaxial line port; and including a high voltage capacitor connected between the second conductor of the individual respective additional port of each transformer and the common connection between a conductor of the sum port and a conductor of each of the multiple additional ports.

3. The high power high frequency circuit of claim 1, wherein the non-ferrite material cooling plates interspersed between ferrite material core sections of the transformers are common to the plurality of transformers of the circuit; and including means electrically grounding an innermost cooling plate to an outermost cooling plate.

4. In a high power high frequency transformer, a ferrite material transformer core section with two elongate relatively narrow coil winding slot windows and magnetic circuit ferrite core material between said slot windows; a single layer of insulated wire turns passed through said slot windows; with the windings including turns of at least two transformer winding sections; wherein the magnetic circuit ferrite core material between said slot windows is substantially rectangular in cross section along a plane normal to the axis of the wire windings within the area enclosed by the winding turns; wherein a plurality of said ferrite material transformer core sections are stacked together; the wire turns are wound through said slot windows and about the magnetic circuit ferrite core material between the slot windows; and means is provided holding coil turns of the transformer in mutually spaced relation including nonconductive assembly retaining bar means having multiple spaced coil turn retaining grooves.

5. In a high power high frequency transformer, a ferrite material transformer core section with two elongate relatively narrow coil winding slot windows and magnetic circuit ferrite core material between said slot windows; a single layer of insulated wire turns passed through said slot windows; with the windings including turns of at least two transformer winding sections; wherein the magnetic circuit ferrite core material between said slot windows is substantially rectangular in cross section along a plane normal to the axis of the wire windings within the area enclosed by the winding turns; wherein a plurality of said ferrite material transformer core sections are stacked together; the wire turns are wound through said slot windows and about the magnetic circuit ferrite core material between the slot windows; non-ferrite material cooling plates are interspersed between said ferrite material core sections; with means holding said stacked core sections and cooling plates in assembled relation; and wherein electrically conductive means is provided electrically grounding an innermost cooling plate to an outermost cooling plate.

6. In a high power high frequency transformer, a ferrite material transformer core section with two elongate relatively narrow coil winding slot windows and magnetic circuit ferrite core material between said slot windows; a single layer of insulated wire turns passed through said slot windows; with the windings including turns of at least two transformer winding sections; wherein the magnetic circuit ferrite core material between said slot windows is substantially rectangular in cross section along a plane normal to the axis of the wire windings within the area enclosed by the winding turns; wherein a plurality of said ferrite material transformer core sections are stacked together; the wire turns are wound through said slot windows and about the magnetic circuit ferrite core material between the slot windows; non-ferrite material cooling plates are interspersed between said ferrite material core sections; said non-ferrite material cooling plates extend outward beyond the outer edges of the ferrite material transformer core sections; and wherein the transformer is one of a plurality of such transformers assembled with common non-ferrite material cooling plates.

7. The high power high frequency transformer of claim 4, wherein said ferrite material transformer core section is of such thickness that a predetermined number of the transformer core sections stacked together, as determined by the thickness of the transformer core sections, presents a substantially square core cross section area between the slot windows.

8. The high power high frequency transformer of claim 5, wherein said ferrite material transformer core sections are of such thickness and said non-ferrite cooling plates are of such thickness that a predetermined number of transformer core sections along with the non-ferrite material cooling plates interspersed therebetween present a substantially square core cross section area between the slot windows within the transformer core coil windings.

9. The high power high frequency transformer of claim 8, wherein additional cooling plates are provided covering the outermost faces of the two outermost transformer core sections.

10. The high power high frequency transformer of claim 5, with said means holding said stacked core sections and cooling plates in assembled relation, including said means electrically grounding an innermost plate to an outermost plate.

11. The high power high frequency transformer of claim 5, wherein said means electrically grounding an innermost plate to an outermost plate is shortingbar means electrically interconnecting an innermost cooling plate and an outermost cooling plate.

12. The high power high frequency transformer of claim 5, wherein said ferrite material transformer core sections are of such thickness and said non-ferrite cooling plates are of such thickness that substantially a number of transformer core sections along with the non-ferrite material cooling plates interspersed therebetween present substantially a rectangular cross section area the stacked height of which as related to the width between the slot windows is predetermined multiple of the width between the slot windows.

References Cited by the Examiner

UNITED STATES PATENTS

| 2,947,957 | 8/1960 | Spindler | 332—61 |
|---|---|---|---|
| 2,990,524 | 6/1961 | O'Mearo et al. | 333—78 |

FOREIGN PATENTS 851,814  10/1960  Great Britain.

LARAMIE E. ASKIN, *Primary Examiner.*

C. TORRES, T. J. KOZMA, *Assistant Examiners.*

UNITED STATES PATENT OFFICE
CERTIFICATE OF CORRECTION

Patent No. 3,287,670                          November 22, 1966

Klaus G. Schroeder

It is hereby certified that error appears in the above numbered patent requiring correction and that the said Letters Patent should read as corrected below.

Column 8, line 62, after "power" insert -- high --; column 10, line 56, for "substantially a" read -- a predetermined --; line 61, for "predetermined" read -- substantially a --.

Signed and sealed this 12th day of September 1967.

(SEAL)
Attest:

ERNEST W. SWIDER
Attesting Officer

EDWARD J. BRENNER
Commissioner of Patents